(12) United States Patent
Chung et al.

(10) Patent No.: US 8,566,566 B2
(45) Date of Patent: Oct. 22, 2013

(54) VECTOR PROCESSING OF DIFFERENT INSTRUCTIONS SELECTED BY EACH UNIT FROM MULTIPLE INSTRUCTION GROUP BASED ON INSTRUCTION PREDICATE AND PREVIOUS RESULT COMPARISON

(75) Inventors: Moo Kyoung Chung, Daejeon (KR); Young Su Kwon, Daejeon (KR); Kyung Su Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 581 days.

(21) Appl. No.: 12/848,489

(22) Filed: Aug. 2, 2010

(65) Prior Publication Data

US 2011/0107063 A1 May 5, 2011

(30) Foreign Application Priority Data

Oct. 29, 2009 (KR) ........................ 10-2009-0103719

(51) Int. Cl.
*G06F 9/30* (2006.01)
(52) U.S. Cl.
USPC .......................................... 712/206; 712/221
(58) Field of Classification Search
None
See application file for complete search history.

(56) References Cited

U.S. PATENT DOCUMENTS

| 2005/0289329 | A1 | 12/2005 | Dwyer et al. |
| 2006/0288195 | A1 | 12/2006 | Ma et al. |
| 2007/0250688 | A1 | 10/2007 | Kyou |
| 2009/0160863 | A1 | 6/2009 | Frank |

FOREIGN PATENT DOCUMENTS

KR 10-2007-0032723 3/2007

OTHER PUBLICATIONS

Scott A. Mahlke et al., "A Comparison of Full and Partial Predicated Execution Support for ILP Processors", Center for Reliable and High-Performance Computing, University of Illinois, Urbana-Champaign, IL 61801, ISCA-22, pp. 1-12, Jun. 1995.

*Primary Examiner* — Kenneth Kim
(74) *Attorney, Agent, or Firm* — Rabin & Berdo, P.C.

(57) ABSTRACT

There is provided a vector processing apparatus and method allowing for the parallel processing of a plurality of different instructions while maintaining vector processing architecture. The vector processing apparatus includes an instruction memory storing a multiple instruction group including one or more instructions; an instruction fetch unit reading the multiple instruction group from the instruction memory; and a plurality of instruction processing units each receiving the multiple instruction group through the instruction fetch unit, selecting a single instruction from the multiple instruction group according to a previous arithmetic result, and performing a arithmetic operation.

8 Claims, 6 Drawing Sheets

| MI 1 | instruction A | | |
|---|---|---|---|
| MI 2 | instruction B | | |
| MI 3 | instruction C-1 | instruction D-1 | instruction E-1 |
| MI 4 | instruction C-2 | instruction D-2 | instruction E-2 |
| MI 5 | instruction C-3 | instruction D-3 | instruction E-3 |
| MI 6 | instruction F | | |

FIG. 3

VECTOR PROCESSING OF DIFFERENT INSTRUCTIONS SELECTED BY EACH UNIT FROM MULTIPLE INSTRUCTION GROUP BASED ON INSTRUCTION PREDICATE AND PREVIOUS RESULT COMPARISON

CROSS-REFERENCE TO RELATED APPLICATIONS

This application claims the priority of Korean Patent Application No. 10-2009-0103719 filed on Oct. 29, 2009, in the Korean Intellectual Property Office, the disclosure of which is incorporated herein by reference.

BACKGROUND OF THE INVENTION

1. Field of the Invention

The present invention relates to a vector processing apparatus and method, and more particularly, to a vector processing apparatus and method allowing for the parallel processing of a plurality of different instructions while maintaining vector processing architecture.

2. Description of the Related Art

Vector processing (or Single Instruction Multiple Data (SIMD)) is a technique designed to process multiple data at a time through the same operation using a single instruction.

Since a vector processing apparatus is capable of processing multiple data using only one instruction, this vector processing apparatus is useful when it is necessary to perform the same operation with respect to a plurality of data. However, a method of processing data in a number of application areas is often different according to types of data. In consideration of this case, instruction processing efficiency may be deteriorated.

That is, since a plurality of data are processed with the same instruction, it is difficult to achieve parallel processing in many applications in which there is no perfect parallelism between data. Accordingly, the inactivation of many arithmetic units may occur, resulting in the deterioration of processing efficiency.

On the other hand, Multiple Instruction Multiple Data (MIMD) is a technique designed to process multiple data by the execution of a plurality of instructions. Even though MIMD may not cause the above-described problems, MIMD may cause communication overhead occurring when arithmetic units read individual instructions from a memory whenever the arithmetic units process multiple data. Due to the limitation of memory bandwidth, degradation of performance may occur.

SUMMARY OF THE INVENTION

An aspect of the present invention provides a vector processing apparatus and method allowing for the parallel processing of a plurality of different instructions while maintaining vector processing architecture.

According to an aspect of the present invention, there is provided a vector processing apparatus including: an instruction memory storing a multiple instruction group including one or more instructions; an instruction fetch unit reading the multiple instruction group from the instruction memory; and a plurality of instruction processing units each receiving the multiple instruction group through the instruction fetch unit, selecting a single instruction from the multiple instruction group according to a previous arithmetic result, and performing a arithmetic operation.

Each of the plurality of instruction processing units may include a multiple instruction selecting unit selecting a single instruction from the multiple instruction group on the basis of a previous arithmetic result when the multiple instruction group is transmitted through the instruction fetch unit, and a arithmetic unit performing a arithmetic operation the instruction selected by the multiple instruction selecting unit and feeding back a arithmetic result to the multiple instruction selecting unit.

The multiple instruction group may include one or more instructions, each of which includes predicate information indicating a condition for execution of the corresponding instruction.

The multiple instruction selecting unit may include a flag register receiving a flag indicating a previous arithmetic result from the arithmetic unit and temporarily storing the flag, and a mux analyzing the predicate information included in the one or more instructions constituting the multiple instruction group on the basis of the flag, selecting a single instruction from the multiple instruction group, and outputting the selected instruction.

The mux may only receive and select a single instruction or select a firstly input instruction unconditionally when the mux fails to receive the flag while firstly performing an instruction selection.

Each of the plurality of instruction processing units may further include a data input/output unit providing input data to the arithmetic unit or storing the arithmetic result of the arithmetic unit.

The vector processing apparatus may further include a data memory disposed outside the plurality of instruction processing units, storing data to be provided to the plurality of instruction processing units, storing a plurality of arithmetic results obtained from the plurality of instruction processing units, or providing the stored arithmetic results to an external device.

According to another aspect of the present invention, there is provided a vector processing method including a plurality of arithmetic operation paths and processing one or more instructions in a parallel manner through the plurality of arithmetic operation paths, the method including: obtaining a multiple instruction group including one or more instructions and providing the obtained multiple instruction group to each of the plurality of arithmetic operation paths; selecting a single instruction included in the multiple instruction group from each of the plurality of arithmetic operation paths on the basis of a previous arithmetic result; and performing a arithmetic operation the selected instruction in a parallel manner in each of the plurality of arithmetic operation paths.

The vector processing method may further include receiving and selecting only a single instruction or selecting a firstly input instruction unconditionally when there is no previous arithmetic result since an instruction selection is firstly performed in each of the plurality of arithmetic operation paths.

BRIEF DESCRIPTION OF THE DRAWINGS

The above and other aspects, features and other advantages of the present invention will be more clearly understood from the following detailed description taken in conjunction with the accompanying drawings, in which:

FIG. 3 illustrates a set of multiple instruction groups according to an exemplary embodiment of the present invention;

DETAILED DESCRIPTION OF THE PREFERRED EMBODIMENT

Figure 1:
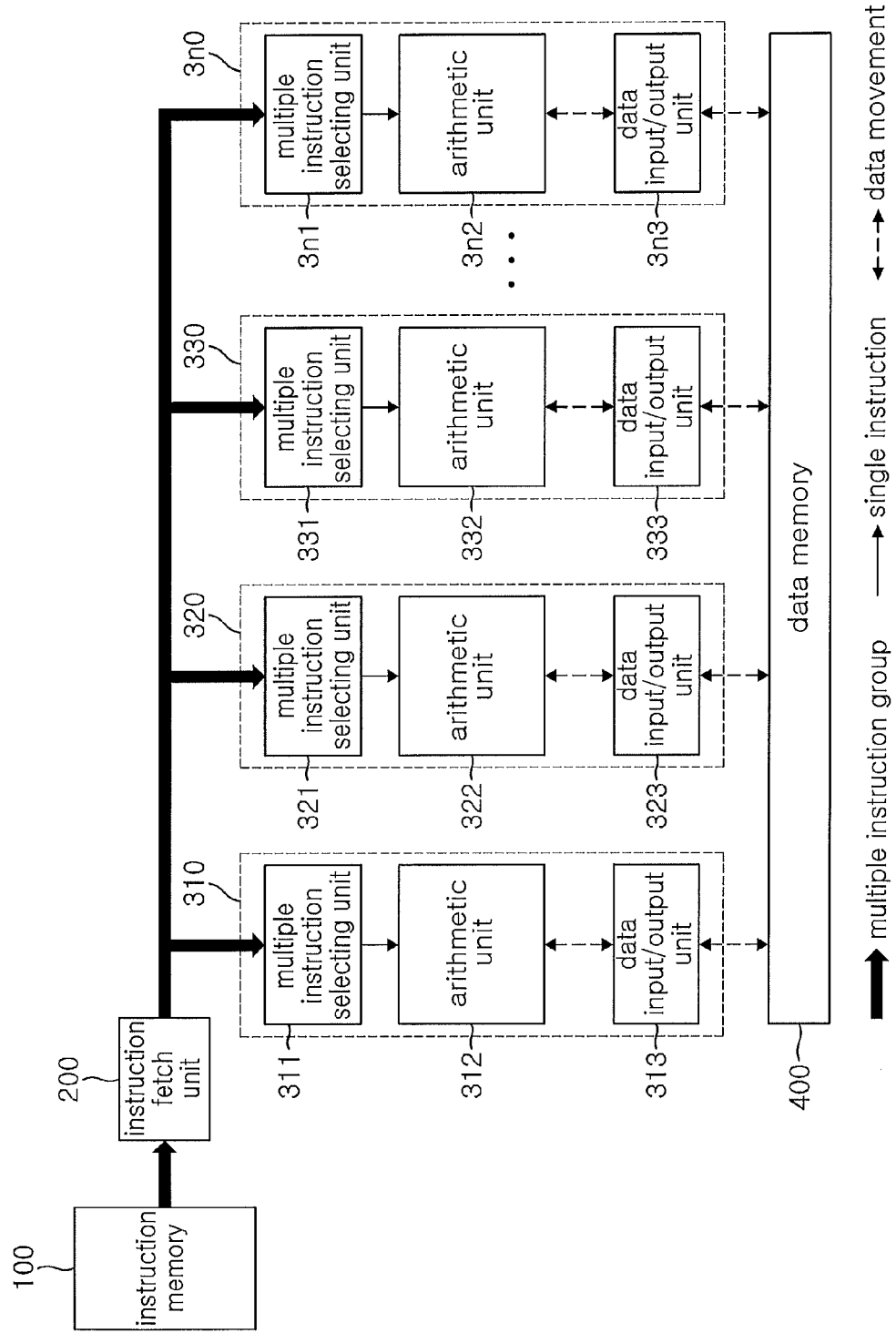
FIG. 1 illustrates a configuration of a vector processing apparatus according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In describing the present invention, if a detailed explanation for a related known function or construction is considered to unnecessarily divert the gist of the present invention, such explanation will be omitted but would be understood by those skilled in the art.

In order to clarify the present invention in the drawings, parts irrelevant to the description of the present invention are omitted, and the same reference numerals will be used throughout to designate the same or like elements.

In addition, unless explicitly described to the contrary, the word "include" and variations such as "includes" or "including," will be understood to imply the inclusion of stated elements but not the exclusion of any other elements.

FIG. 1 illustrates a configuration of a vector processing apparatus according to an exemplary embodiment of the present invention.

Referring to FIG. 1, the vector processing apparatus according to this embodiment includes an instruction memory 100, an instruction fetch unit 200, and a plurality of instruction processing units 310 to 3$n$0. The plurality of instruction processing units 310 to 3$n$0 includes multiple instruction selecting units 311 to 3$n$1 and arithmetic units 312 to 3$n$2, respectively.

Hereinafter, a description related to the function of each element will be made in detail.

The instruction memory 100 stores a multiple instruction group to be used in the vector processing apparatus and provides the multiple instruction group to the instruction fetch unit 200.

Here, the multiple instruction group includes one or more instructions combined according to instruction processing conditions of the vector processing apparatus, which may be generated by a compiler (not shown) of the vector processing apparatus or manually created by an assembler or the like.

Figure 2:
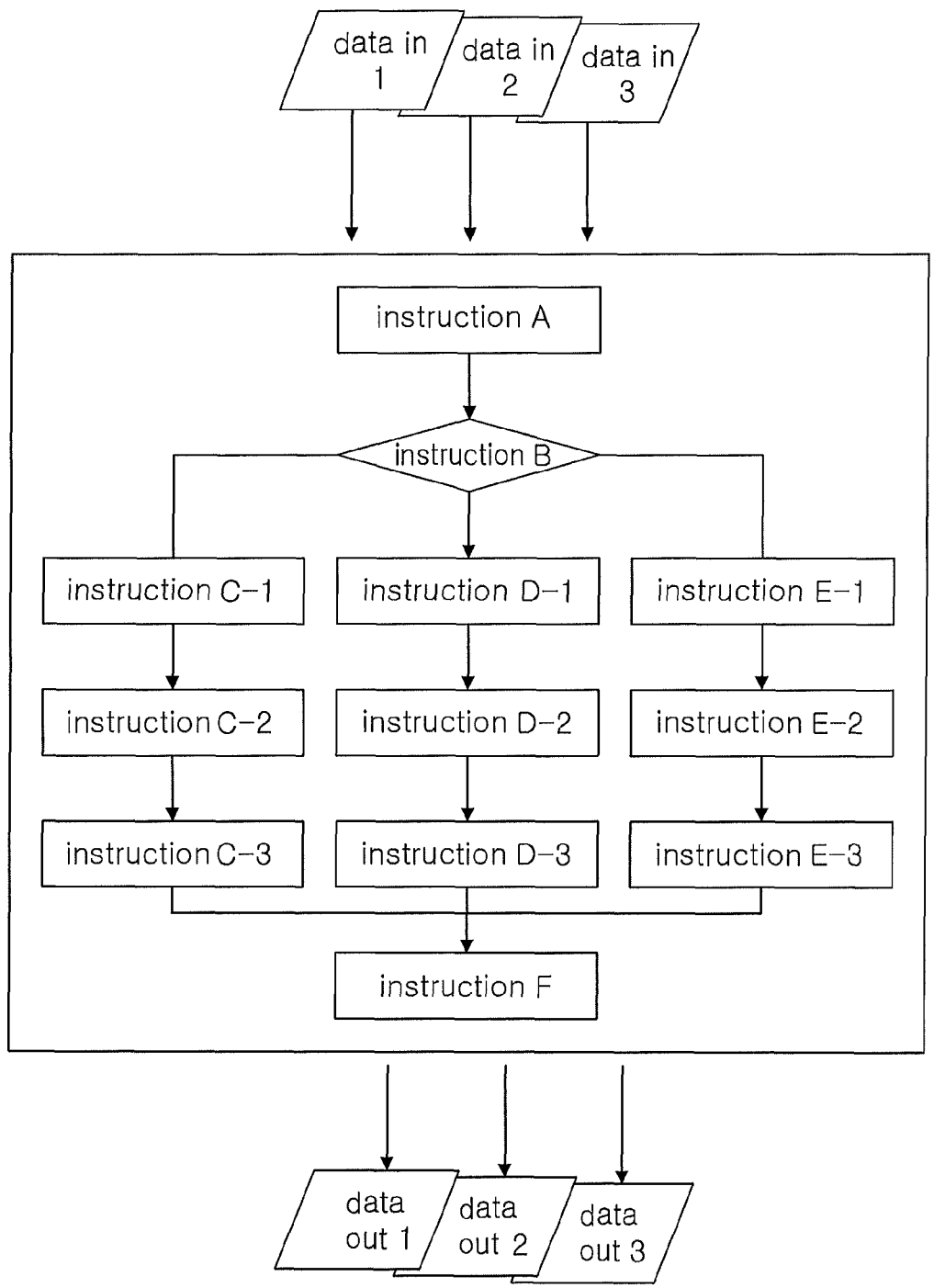
FIG. 2 illustrates an instruction processing condition (applied?) in a vector processing apparatus according to an exemplary embodiment of the present invention.

For example, as shown in FIG. 2, the vector processing apparatus processes three data DATA IN 1, 2 and 3 according to the following three methods:

1) Instruction A→Instruction B→Instruction C-1→Instruction C-2→Instruction C-3→Instruction F 2) Instruction A→Instruction B→Instruction D-1→Instruction D-2→Instruction D-3→Instruction F 3) Instruction A→Instruction B→Instruction E-1→Instruction E-2→Instruction E-3→Instruction F In consideration of the above instruction processing conditions, as shown in FIG. 3, a multiple instruction group 1 MI1 including an instruction A, a multiple instruction group 2 MI2 including an instruction B, a multiple instruction group 3 MI3 including instructions C-1, D-1, and E-1, a multiple instruction group 4 MI4 including instructions C-2, D-2, and E-2, a multiple instruction group 5 MI5 including instructions C-3, D-3, and E-3, and a multiple instruction group 6 MI6 including an instruction F are stored in the instruction memory 100.

The instruction fetch unit 200 reads the multiple instruction groups that are stored in the instruction memory 100 and transmits them to the plurality of instruction processing units 310 to 3$n$0.

Each of the multiple instruction selecting units 311 to 3$n$1 selects one of the multiple instruction groups, transmitted from the instruction fetch unit 200, on the basis of a previous arithmetic result of a corresponding arithmetic unit of the arithmetic units 312 to 3$n$2, and then transmits the selected instruction to the corresponding arithmetic unit.

However, when each of the multiple instruction selecting units 311 to 3$n$1 performs its first selection, it fails to receive feedback on a previous arithmetic result from a corresponding arithmetic unit of the arithmetic units 312 to 3$n$2. According to this embodiment of the invention, in order to deal with such a problem, when the multiple instruction selecting units 311 to 3$n$1 perform the first selection, the multiple instruction selecting units 311 to 3$n$1 receive a multiple instruction group including only one instruction from the instruction fetch unit 200 or select a firstly input instruction unconditionally.

Each of the arithmetic units 312 to 3$n$2 processes plural data on the basis of a single instruction selected by a corresponding multiple instruction selecting unit of the multiple instruction selecting units 311 to 3$n$1, and then feeds back the arithmetic result to the corresponding multiple instruction selecting unit, thereby allowing the corresponding multiple instruction selecting unit to select the next instruction to be sequentially processed.

In this manner, each of the multiple instruction selecting units 311 to 3$n$1 exactly detects an instruction required by the corresponding arithmetic unit of the arithmetic units 312 to 3$n$2 among a multiple instruction group that is currently input according to the arithmetic result of the corresponding arithmetic unit, selects the detected instruction, and provides the selected instruction to the corresponding arithmetic unit.

Therefore, even in a vector processing apparatus that does not usually achieve parallelism, a plurality of instructions having different information can be processed in a parallel manner.

Also, the vector processing apparatus according to this embodiment further includes data input/output units 313 to 3$n$3 and a data memory 400 in order to provide input data to the arithmetic units and store arithmetic results. The data input/output units 313 to 3$n$3, respectively included in the instruction processing units 310 to 3$n$0, provide input data to the arithmetic units 312 to 3$n$2, or store the arithmetic results of the arithmetic units 312 to 3$n$2. The data memory 400 is disposed outside the plurality of instruction processing units 310 to 3$n$0, stores data to be provided to the plurality of instruction processing units 310 to 3$n$0 or a plurality of arithmetic results obtained from the plurality of instruction processing units 310 to 3$n$0, or provides the stored arithmetic results to an external device.

Figure 4:
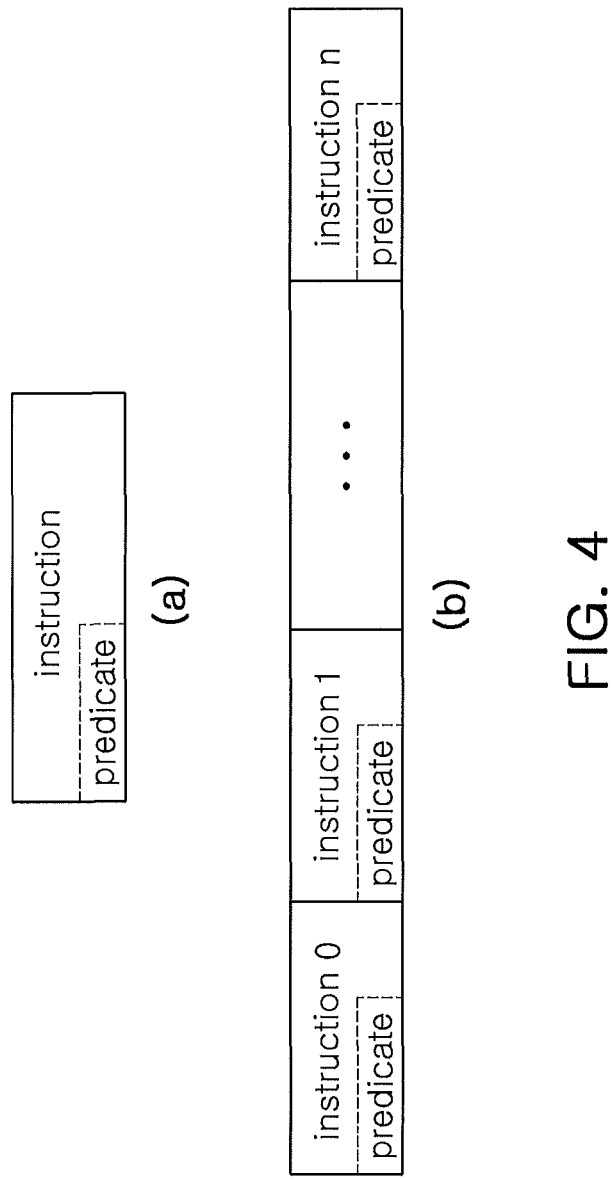
FIG. 4 illustrates the structure of a multiple instruction group according to an exemplary embodiment of the present invention.

FIG. 4 illustrates the structure of a multiple instruction group according to an exemplary embodiment of the present invention.

A multiple instruction group according to this embodiment may include only one instruction as shown in FIG. 4A or a plurality of instructions as shown in FIG. 4B.

Each instruction includes predicate information indicating a condition for the execution of the corresponding instruction. By using such predicate information, the multiple instruction selecting units 311 to 3n1 are allowed to select their own required instructions.

Figure 5:
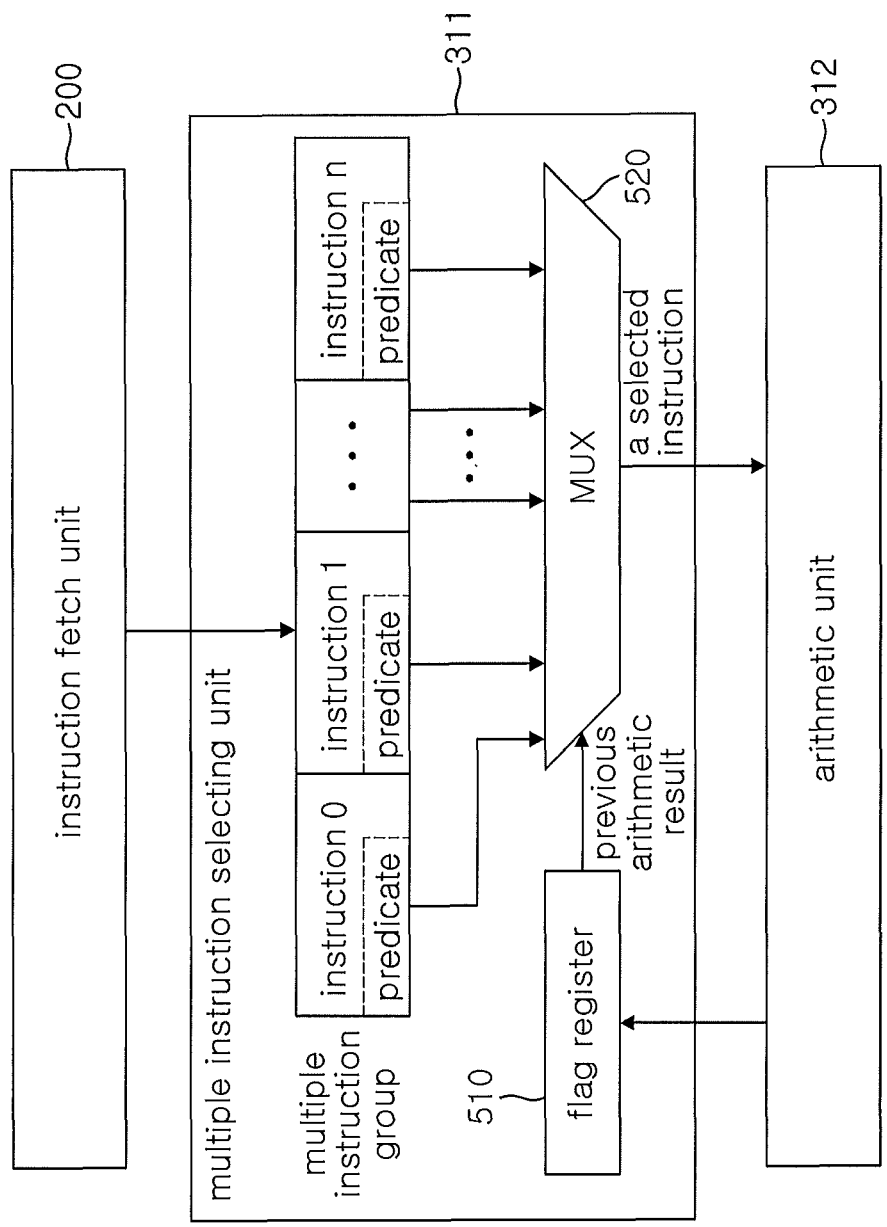
FIG. 5 illustrates a detailed configuration of an instruction processing unit according to an exemplary embodiment of the present invention.

FIG. 5 illustrates a detailed configuration of an instruction processing unit according to an exemplary embodiment of the present invention.

Referring to FIG. 5, the multiple instruction selecting unit 311 according to this embodiment includes a flag register 510 and a mux 520.

The flag register 510 receives a flag indicating a previous arithmetic result from the arithmetic unit 312 and temporarily stores the flag.

The mux 520 analyzes predicate information included in one or more instructions constituting a multiple instruction group on the basis of the flag that is temporarily stored in the flag register 510 and detects which instruction the arithmetic unit 312 currently requires. Then, the mux 520 selects only the corresponding instruction and provides the selected instruction to the arithmetic unit 312.

That is, the mux 520 detects an instruction required by the arithmetic unit 312 for the next arithmetic operation by determining whether the flag and the predicate information coincide with each other and analyzing the comparison between the flag and the predicate information, selects the instruction, and provides the selected instruction to the arithmetic unit 312.

Figure 6:
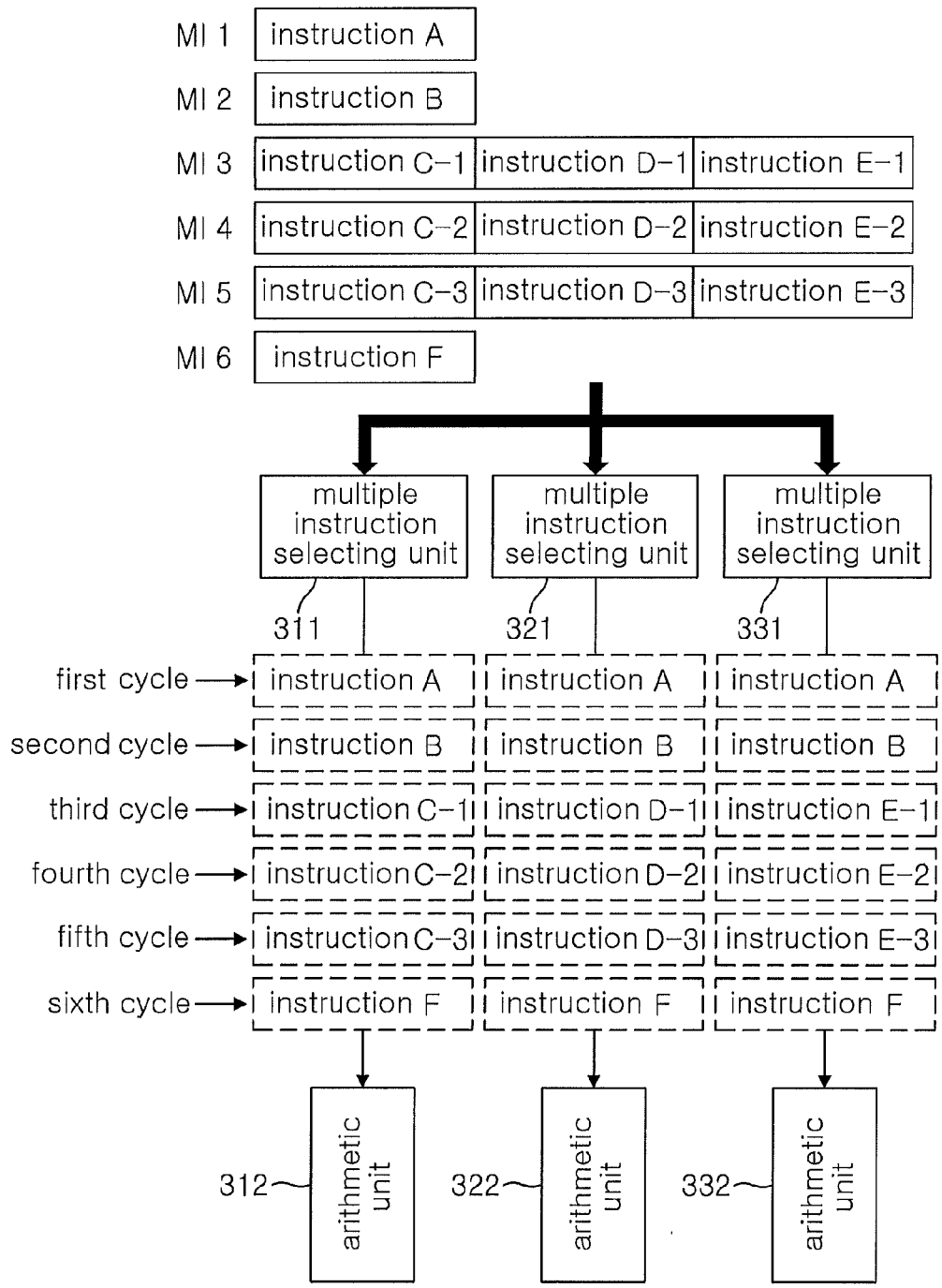
FIG. 6 illustrates an operating method of a vector processing apparatus according to an exemplary embodiment of the present invention.

FIG. 6 illustrates a vector processing method according to an exemplary embodiment of the present invention.

For convenience of explanation, a vector processing apparatus shown in FIG. 6 includes three instruction processing units, wherein the three instruction processing units receive the plurality of multiple instruction groups MI1 to MI6 as illustrated in FIG. 3 from an instruction fetch unit and process the plurality of multiple instruction groups MI1 to MI6 in a parallel manner according to the instruction processing conditions as illustrated in FIG. 2.

Here, the three instruction processing units include parallel processing paths where the multiple instruction groups are processed in parallel.

First, when a first cycle begins and the multiple instruction group 1 MI1 including an instruction A is input, each of the first to third multiple instruction selecting units 311 to 331 selects the instruction A, and each of the first to third arithmetic units 312 to 332 responds thereto and performs a arithmetic operation on the basis of the instruction A.

Next, when a second cycle begins and the multiple instruction group 2 MI2 including an instruction B is input, each of the first to third multiple instruction selecting units 311 to 331 selects the instruction B, and each of the first to third arithmetic units 312 to 332 performs a arithmetic operation on the basis of the instruction B.

After that, when a third cycle begins and the multiple instruction group 3 MI3 including instructions C-1, D-1, and E-1 is input, the first, second, and third multiple instruction selecting units 311, 321, and 331 select the instructions C-1, D-1, and E-1, respectively. Then, the first, second, and third arithmetic units 312, 322, and 332 perform arithmetic operations on the basis of the instructions C-1, D-1, and E-1, respectively.

When a fourth cycle begins and the multiple instruction group 4 MI4 including instructions C-2, D-2, and E-2 is input, the first, second, and third multiple instruction selecting units 311, 321, and 331 select the instructions C-2, D-2, and E-2, respectively. Then, the first, second, and third arithmetic units 312, 322, and 332 perform arithmetic operations on the basis of the instructions C-2, D-2, and E-2, respectively.

When a fifth cycle begins and the multiple instruction group 5 MI5 including instructions C-3, D-3, and E-3 is input, the first, second, and third multiple instruction selecting units 311, 321, and 331 select the instructions C-3, D-3, and E-3, respectively. Then, the first, second, and third arithmetic units 312, 322, and 332 perform arithmetic operations on the basis of the instructions C-3, D-3, and E-3, respectively.

Lastly, when a sixth cycle begins and the multiple instruction group 6 MI6 including an instruction F is input, each of the first to third multiple instruction selecting units 311 to 331 selects the instruction F, and each of the first to third arithmetic units 312 to 332 performs a arithmetic operation on the basis of the instruction F.

As described above, in the vector processing method according to this embodiment of the invention, the parallel processing of a plurality of instructions are achieved in such a manner that a multiple instruction group is input in a parallel manner and each of the instructions included in the multiple instruction group is selected and calculated in a parallel manner.

As set forth above, in a vector processing apparatus and method according to exemplary embodiments of the invention, parallel processing is achieved even in the applications which do not ensure parallelism by allowing a plurality of instruction processing units to select a corresponding instruction of a plurality of instructions.

Also, since a single instruction memory and a single instruction fetch unit are used in the present invention, hardware overhead is minimized.

A multiprocessor apparatus according to the related art uses an instruction memory as a shared memory, and accordingly a arithmetic unit is often interrupted due to the limitation of memory bandwidth. In the present invention, however, resource sharing does not occur by using a single instruction memory and a single instruction fetch unit, and thus more improved processing efficiency is achieved.

While the present invention has been shown and described in connection with the exemplary embodiments, it will be apparent to those skilled in the art that modifications and variations can be made without departing from the spirit and scope of the invention as defined by the appended claims.

What is claimed is:

1. A vector processing apparatus, comprising:
    an instruction memory storing a multiple instruction group including one or more instructions;
    an instruction fetch unit reading the multiple instruction group from the instruction memory; and
    a plurality of instruction processing units, each instruction processing unit including a multiple instruction selecting unit and an arithmetic unit, the multiple instruction selecting unit receiving the multiple instruction group through the instruction fetch unit, and selecting a single instruction from the multiple instruction group according to a comparison using a previous arithmetic result of the arithmetic unit and predicate information contained in each of the one or more instructions, and the arithmetic unit performing an arithmetic operation according to the selected single instruction.

2. The vector processing apparatus of claim 1, wherein the multiple instruction group includes one or more instructions, each of which includes the predicate information indicating indicates a condition for execution of its corresponding instruction.

3. The vector processing apparatus of claim 2, wherein the multiple instruction selecting unit comprises:
  a flag register receiving a flag indicating the previous arithmetic result from the arithmetic unit and temporarily storing the flag; and
  a mux analyzing the predicate information included in the one or more instructions constituting the multiple instruction group on the basis of the flag, selecting the single instruction from the multiple instruction group, and outputting the selected instruction.

4. The vector processing apparatus of claim 3, wherein the mux only receives and selects the single instruction or selects a firstly input instruction unconditionally when the mux fails to receive the flag while firstly performing an instruction selection.

5. The vector processing apparatus of claim 1, wherein each of the plurality of instruction processing units further comprises a data input/output unit providing input data to its arithmetic unit or storing a result of the arithmetic operation of its arithmetic unit.

6. The vector processing apparatus of claim 1, further comprising a data memory disposed outside the plurality of instruction processing units, storing data to be provided to the plurality of instruction processing units, storing a plurality of arithmetic results obtained from the plurality of instruction processing units, or providing the stored arithmetic results to an external device.

7. A vector processing method for processing one or more instructions in a parallel manner through a plurality of arithmetic operation paths, the method comprising:
  obtaining a multiple instruction group including one or more instructions, and providing the obtained multiple instruction group to each of the plurality of arithmetic operation paths; and
  for each of the plurality of arithmetic operation paths,
    selecting a single instruction included in the multiple instruction group on the basis of a comparison using a previous arithmetic result of the arithmetic operation path and predicate information contained in each of the one or more instructions; and
    performing an arithmetic operation according to the selected instruction in the arithmetic operation path,
  wherein
  the plurality of arithmetic operation paths perform the arithmetic operations in parallel.

8. The method of claim 7, further comprising each of the plurality of arithmetic operation paths receiving and selecting only the single instruction or selecting a firstly input instruction unconditionally when there is no previous arithmetic result when an instruction selection is firstly performed in the arithmetic operation path.

* * * * *